United States Patent Office 3,169,840
Patented Feb. 16, 1965

3,169,840
METHOD FOR REMOVING WATER FROM FORMALDEHYDE
Louis L. Wood, Washington, D.C., assignor to W. R. Grace & Co., New York, N.Y., a corporation of Connecticut
No Drawing. Filed Nov. 4, 1963, Ser. No. 321,336
4 Claims. (Cl. 55—29)

The present invention relates to the drying of formaldehyde, and more specifically to a simple one-step process for removing small amounts of water from a formaldehyde gas stream.

It is generally known that water seriously interferes with the polymerization of formaldehyde to form high molecular weight polyoxymethylene polymers. As little as 0.1% by weight of water will frequently prevent the formation of consistently high molecular weight products.

Numerous methods have been suggested in the prior art to dry formaldehyde. These methods utilize both physical and chemical means. However, due to the fact that formaldehyde has a great affinity for water, and is extremely reactive toward practically all efficient desiccants, only the most complex physical separation plants, and practically no desiccants have proven satisfactory for wide scale application.

It is therefore an object of the present invention to provide an improved method for drying formaldehyde.

It is another object to provide a desiccant for extracting substantially all water from formaldehyde which is substantially non-reactive toward formaldehyde.

These and still further objects of the present invention will become readily apparent to one skilled in the art through the following detailed description and specific examples.

Broadly, the present invention contemplates a method for drying formaldehyde which comprises passing a gaseous stream of a water contaminated formaldehyde through liquid dimethylsulfoxide maintained at a temperature of from about 20° to about 110° C. and preferably at from 50° to 100° C.

Mode specifically, I have found that practically the last traces of water contained in a formaldehyde gas stream may be quickly and conveniently removed by contracting the formaldehyde with dimethylsulfoxide which is maintained preferably at a temperature from about 50 to about 100° C., and which preferably contains below about 5% by weight of water dissolved therein. Gaseous formaldehyde which has been dried in this manner may be easily polymerized to form high molecular weight polymers using any one of numerous polymerization catalyst and processes well known to those skilled in the art.

Gaseous formaldehyde which is treated in accordance with the present invention, may possess practically any water content. However, since a given amount of dimethylsulfoxide will absorb only a certain amount of water, it is preferred to have a formaldehyde gas stream containing as little water as possible. In this manner less dimethylsulfoxide is required for a given drying operation. Generally speaking, it is preferred to have an incoming formaldehyde gas containing not more than about 5% by weight of water. Such a formaldehyde gas stream may be readily obtained by pyrolysis of paraformaldehyde which generally results in a formaldehyde gas containing from about 3 to about 5% by weight of water. It is also possible to utilize formaldehyde gas stream obtained by any one of the commercially used processes for synthesizing formaldehyde gas. Furthermore, gaseous streams which have been previously treated by mechanical separation procedures to remove large amounts of water may also be effectively treated in accordances with the teachings of the present invention.

Dimethylsulfoxide which is used in carrying out the present invention preferably contains below about 5% by weight of water. Dimethylsulfoxide containing below this amount of water will effectively scavenge water from an incoming formaldehyde gas stream. If a substantially anhydrous dimethylsulfoxide is used in the practice of the invention it is found that up to about 0.05 g. of water per gram of dimethylsulfoxide used may be absorbed from an incoming formaldehyde gas stream before the dimethly sulfoxide becomes saturated to a degree wherein it no longer is capable of removing substantially all the water from the formaldehyde gas stream. Once the dimethylsulfoxide has absorbed the maximum amount of water, that is, about 5% by weight of water, it may be conveniently dried by heating to a temperature of from about 150° to 180° C. to drive off water and any residual formaldehyde which may be entrained in the dimethylsulfoxide.

The dimethylsulfoxide which is used to absorb water from formaldehyde is maintained at a preferred temperature of from about 50 to about 100° C. It is found that in this temperature range, dimethylsulfoxide will extract water from the formaldehyde gas stream in a minimum amount of time. In a preferred method for conducting the drying operation, formaldehyde gas is simply bubbled through a liquid body of dimethylsulfoxide contained at the required temperature. The exact time that the formaldehyde gas stream is in contact with the dimethylsulfoxide it is dependent upon the efficiency of the particular contact apparatus or system used. That is, if the formaldehyde gas is contacted in the form of very fine bubbles, it is found that absorption of the water occurs in a shorter time than if the larger gas bubbles are passed through the dimethylsulfoxide mass.

In its simplest form, the apparatus used to conduct the present process may comprise a simple cylinder having a gas inlet at the bottom and an outlet at the top. Dimethylsulfoxide is maintained within the cylinder at the desired temperature and the formaldehyde gas is passed under pressure into the bottom of the cylinder. As the formaldehyde gas bubbles up through the dimethylsulfoxide, water is absorbed therefrom and dried formaldehyde gas passes from the top of the cylinder. Obviously, the present invention is not restricted to the use of the aforementioned apparatus and any commercially available liquid-gas contact apparatus may be effectively used.

The formaldehyde gas which is dried by the aforementioned contact with dimethylsulfoxide contains only trace amounts of water. The actual amount of water which remains in the formaldehyde gas depends to some extent on the contact time with dimethylsulfoxide as well as the water content dimethylsulfoxide used. The actual amount of dehydration required for a given drying operation will depend on the ultimate use to which the formaldehyde gas is to be put.

Generally speaking, when the formaldehyde gas is to be used in subsequent polymerizations, it is found that a water content from about 0.01 to about 0.1% is permissible. Obviously, commercial consideration will frequently govern the particular degree of water removal which must be achieved.

Throughout the processing of the formaldehyde gas stream, it is generally preferred to maintain it at a minimum temperature of about 70 to 90° C. It is found that the formaldehyde gas will spontaneously polymerize at temperatures below this range. This spontaneously polymerized formaldehyde will serve to clog handling conduits as well as cause decrease percentage yield of dried formaldehyde gas.

In the event that the formaldehyde dried in accordance with the present invention is to be polymerized, any one of numerous polymerization methods known to those skilled in the art may be used. Catalysts such as metallic oxides and organic bases when used in conjunction with reaction solvents such as alkanes, cycloalkanes and aromatics will produce high molecular weight polyoxymethylene when used with the present formaldehyde gas at temperatures ranging from about −70 to about 70° C.

In the ensuing specific examples, a standard polymerization method is adapted as a means for determitning the effectiveness of the present water removal method. Water is so detrimental to the obtaining of high molecular weight polymer, it is found that molecular weight determinations obtained from polyoxymethylene obtained by using formaldehyde gas containing varying amounts of water is an effective means for indicating the water content of an incoming formaldehyde gas.

Having described the basic aspects of the present invention the following examples are given to illustrate embodiments thereof.

Example I

Paraformaldehyde having a particle size of 50 to 100 U.S. mesh and containing about 3% by weight of water was heated in a closed reaction vessel to a temperature of 250° C. The reaction mixture was swept with nitrogen gas. The nitrogen sweep carried about 1.5 g. per minute of the resultant formaldehyde gas into a second reaction vessel. The second reaction vessel comprised a 50 mm. reactor column containing 25 ml. of dimethylsulfoxide which contained less than 0.1% by weight of water. The dimethylsulfoxide was maintained at a temperature of 85 to 95° C. while the wet formaldehyde gas from the first reaction vessel was passed into the bottom of the second reaction vessel.

The dried formaldehyde gas coming from the top of the second reaction vessel containing the dimethylsulfoxide was passed into a series of polymerization vessels which contained solution of 0.1 ml. of tri-n-butylamine in 50 ml. of dry cyclohexane. The polymerization reaction mixtures were kept at a temperature of 25 to 30° C. As the dried formaldehyde gas passed into the polymerization vessels, polyoxymethylene polymer precipitated from the solution. This polymer was isolated by filtration and the reduced specific viscosity ($n$ sp/c) was determined at 140° C. using a 0.15% solution of the polyoxymethylene in benzyl alcohol containing 1% by weight diphenylamine and 0.05% by weight N,N,N',N'-tetrakis-(2-hydroxypropyl) ethylene diamine.

The result of 5 2-minute runs are tabulated below:

| Run | Time (min.) | | POM isolated | |
|---|---|---|---|---|
| | On | Off | Wt. (g.) | $n$ sp/c |
| 1 | 2 | 4 | 0.3 | 0.89 |
| 2 | 14 | 16 | 0.4 | 0.82 |
| 3 | 17 | 19 | 0.4 | 0.88 |
| 4 | 21 | 23 | 0.4 | 0.88 |
| 5 | 25 | 27 | 0.5 | 0.80 |

Example II

In a procedure identical to that outlined in Example I with the exception that the second vessel containing the dimethylsulfoxide was omitted, formaldehyde gas generated from the first reaction vessel was passed directly into similar polymerization solutions. The results of two such runs are tabulated below:

| Run | Time (min.) | | POM isolated | |
|---|---|---|---|---|
| | On | Off | Wt. (g.) | $n$ sp/c |
| 1 | 2 | 4 | 0.38 | 0.16 |
| 2 | 10 | 12 | 0.62 | 0.14 |

It is seen from the above specific example that when dimethylsulfoxide is used as the drying agent, a high molecular weight polyoxymethylene polymer is obtained. This indicates that the water from the initial gas stream is thoroughly and efficiently removed by contact with dimethylsulfoxide.

I claim:

1. A method for removing water from formaldehyde which comprises contacting a gaseous stream of formaldehyde with dimethylsulfoxide maintained at a temperature of from about 20 to about 110° C., and separating said formaldehyde from said dimethylsulfoxide.

2. A method for claim 1 wherein said dimethylsulfoxide contains a maximum of about 5% by weight of water.

3. A method of claim 2 wherein said formaldehyde gas coming into contact with dimethylsulfoxide contains up to about 5% by weight of water.

4. A method for removing water from formaldehyde which comprises contacting a gaseous stream of formaldehyde containing from up to about 5% by weight of water with dimethylsulfoxide containing less than about 5% by weight of water maintained at a temperature from about 20 to about 110° C., maintaining said gaseous formaldehyde contact with said dimethylsulfoxide until the moisture content of such formaldehyde is reduced to below about 0.1% by weight and separating said formaldehyde gas from said dimethylsulfoxide.

References Cited by the Examiner

UNITED STATES PATENTS 2,365,898  12/44  Morris et al.
2,780,652  2/57  Gander _____ 260—606

REUBEN FRIEDMAN, *Primary Examiner.*